Figure 1:
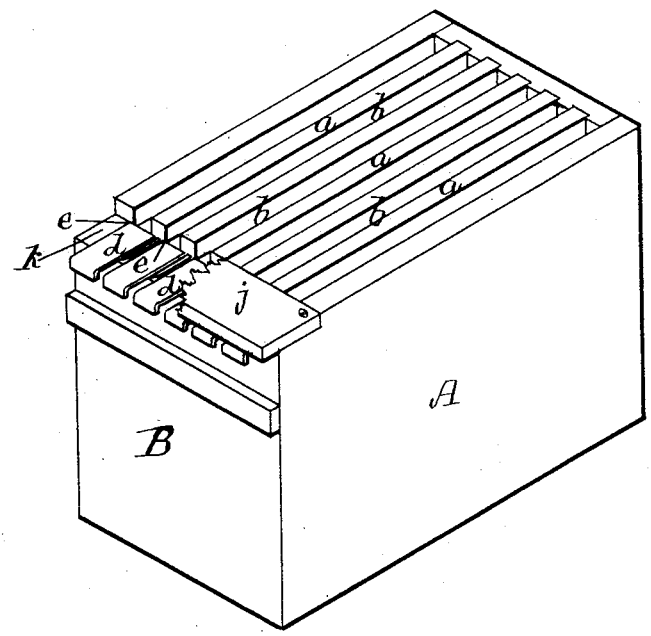

(No Model.)

T. H. BLAIR.
Photographic Camera.

No. 239,925.                    Patented April 12, 1881.

Witnesses.
H. E. Lodge
Francis A. Osborn

Inventor.
Thomas H. Blair.
J. Curtis. Atty.

United States Patent Office.

THOMAS H. BLAIR, OF FRANKLIN, MASSACHUSETTS.

PHOTOGRAPHIC CAMERA.

SPECIFICATION forming part of Letters Patent No. 239,925, dated April 12, 1881.

Application filed June 2, 1880. (No model.)

*To all whom it may concern:*

Be it known that I, THOMAS H. BLAIR, a citizen of the United States, residing in Franklin, county of Norfolk, State of Massachusetts, have invented certain Improvements in Photographic Cameras; and I do declare the following to be a full, clear, and exact description of the invention, such as will enable others skilled in the art to which it appertains to make and use the same.

My present invention is an improvement upon a camera shown and described in Letters Patent issued to myself on the 30th day of March, A. D. 1880, and numbered 226,022, in which a "dark-box," so-called, is employed, having a series of vertical grooves in opposite ends to contain the sensitized plate, and when in use arranged above and operating with an aperture in the top of the camera proper, and a sliding-plate carrier in such camera, the entire bottom of the dark-box being open except as closed by a thin slide-plate, and each pair of grooves being provided with a clamp-screw or other key which confines the sensitized plate in place in the box, such screw being retracted to permit a plate to drop into the carrier when an exposure is to be made. In this patented camera it is necessary, before releasing and dropping a plate into the camera below, to withdraw the sliding bottom of the dark-box, the objection to which is that it sometimes happens a second or third plate may become released from the confining-screw and drops into the camera, and the entire apparatus disarranged and the plates ruined by exposure to light before they can be got back to the box. In addition to this, the receptacle to each and every plate being opened with every removal of the sliding bottom of the dark-box, a tendency exists to admit light directly to each plate with every movement—a result which it is important to avoid.

In my present camera I divide the box, by partitions, into separate plate-receptacles, and employ an independent slide to each receptacle and plate, thereby insulating each plate from any of the others, avoiding the danger of misplacement of plates, the admission of light, and the expense of the set-screws in excess of that of the partitions. It is in the employment of these independent slide-plates, operating with closed plate-receptacles, that the main feature of my present improvement consists.

Secondary features of my invention consist in a spring-impelled plunger or block contained in a pocket over the outer end of each slide-plate, and serving, besides effecting a tight joint upon and with the latter, to prevent access of light to the interior of the receptacles while the plate is being withdrawn.

Figure 3:
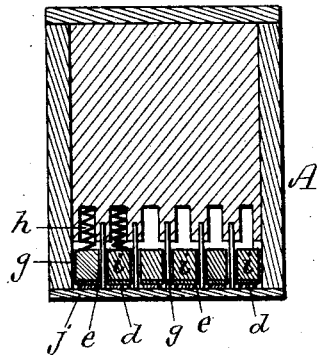
Figure 2:
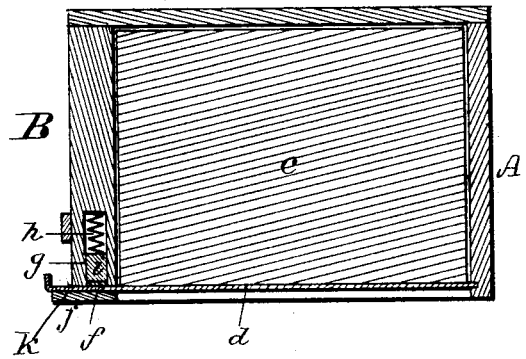

The drawings accompanying this specification represent, in Figure 1, a perspective view of a dark-box containing my invention, the box being inverted for the occasion, while Fig. 2 is a longitudinal, and Fig. 3 a transverse, section of such box and the sensitized plates contained in it.

In these drawings, A represents a rectangular box of a length and depth adapted to the size of sensitized plates to be used, while the width of the box is determined by the number of plates it is to carry—usually six or twelve. The box A is tightly closed on all sides except at bottom, and is divided longitudinally by vertical partitions $a$ $a$, &c., into a series of equal divisions or inclosures, $b$ $b$, &c., each of which is to loosely contain a sensitized plate, $c$, as shown in Fig. 2. Each receptacle $b$ is closed at bottom by a thin plate, $d$, which slides in grooves $e$ $e$, created in opposite sides of the mouth of each receptacle, these plates at one end burying themselves in a lateral groove at the end of the receptacle, and the other or front end protruding beyond the face of the box into a position to be readily grasped by the operator, a thin aperture, $f$, being created in the end of the box to permit the passage of each plate. Each sensitized plate rests upon the top of a slide, $d$, and when it becomes desirable to expose one of the former the slide upon which it rests is to be pulled out and removed from beneath it, when the plate is free to drop into the carrier of the camera. By this means the dropping of several plates into the camera at the same time is avoided, for as each plate-receptacle is sealed against communication with its fellow the opening of one does not imperil a plate in any of the others.

If a slide should be withdrawn entirely from the box light would get access to the sensitized plate through the aperture leading to it if some provision is not made to exclude it. To avoid this result I create in the front wall, B, of the box, and opposite each plate-receptacle, a pocket, g, in the upper part of which I insert a coiled or other spring, h, and below this spring I place in the pocket a loosely-fitting plunger or block, i, and I cover the series of blocks by a bar, j, which is contained in a transverse rabbet, k, in the lower edge of the said wall B. The stress of the spring crowds the block down upon the top of the bar j when the slide is withdrawn, and serves to exclude light through the aperture leading to the plate-receptacle; or, if the slide is inserted, the block is pressed upon the top of such slide and prevents possibility of entrance of light about the front end of the latter.

The bottom of each block or plunger may be padded with wash-leather or other semi-elastic or soft substance, to enable the slide to move easily and yet exclude light.

I claim—

1. In combination with each plate-receptacle and the slide covering the opening thereto, a spring-impelled block or plunger, arranged over the outer end of the slide, and operating, when the latter is removed, to exclude the passage of light to the plate-receptacle by way of the aperture in the end of the dark-box, which receives the slide by closing such aperture, substantially as and for the purposes stated.

2. In combination with each plate-receptacle of the dark-box, a slide which constitutes a shifting bottom to such receptacle, and a spring-impelled plunger constructed, arranged, and operating to close the slide-admitting aperture in the box-front when the slide is withdrawn, substantially as and for purposes set forth.

In testimony whereof I affix my signature in presence of two witnesses.

THOS. H. BLAIR.

Witnesses:
H. E. LODGE,
F. CURTIS.